United States Patent [19]

Willie et al.

[11] Patent Number: 5,067,153
[45] Date of Patent: Nov. 19, 1991

[54] METHOD FOR TRANSMITTING SUBSCRIBER DATA IN COMMUNICATION SYSTEMS FROM ONE SECRET SUBSCRIBER EQUIPMENT TO ANOTHER

[75] Inventors: Klaus Willie; Helmut Kienberger; Erika Marwitz, all of Munich, Fed. Rep. of Germany

[73] Assignee: Siemens Aktiengesellschaft, Berlin and Munich, Fed. Rep. of Germany

[21] Appl. No.: 589,385

[22] Filed: Sep. 27, 1990

[30] Foreign Application Priority Data

Sep. 28, 1989 [DE] Fed. Rep. of Germany ....... 3932498
Nov. 15, 1989 [DE] Fed. Rep. of Germany ....... 3938000

[51] Int. Cl.$^5$ .......................... H04K 1/00; H04K 9/00; H04M 1/24
[52] U.S. Cl. ......................... 380/23; 379/34; 379/142; 380/48
[58] Field of Search ............... 379/34, 142; 380/48, 380/23

[56] References Cited

U.S. PATENT DOCUMENTS

| | | | |
|---|---|---|---|
| 4,320,258 | 3/1982 | McDonald | 379/142 |
| 4,876,717 | 10/1989 | Barron et al. | 380/25 |
| 4,893,325 | 1/1990 | Pankonen et al. | 379/142 |
| 4,937,862 | 6/1990 | Kosich | 379/34 |
| 4,942,598 | 7/1990 | Davis | 379/142 |

Primary Examiner—Stephen C. Buczinski

[57] ABSTRACT

A transmission of subscriber data occurs between subscriber equipment in communication systems in order to be able to display such subscriber data on a display of subscriber equipment of a call partner. The display of the subscriber data of what is referred to as secret subscriber equipment at the call partner is prevented. The secret status of such subscriber equipment can be canceled in general or call-associated with identification information that is generated and transmitted on the basis of an identification function activated with cancel secrecy information.

15 Claims, 1 Drawing Sheet

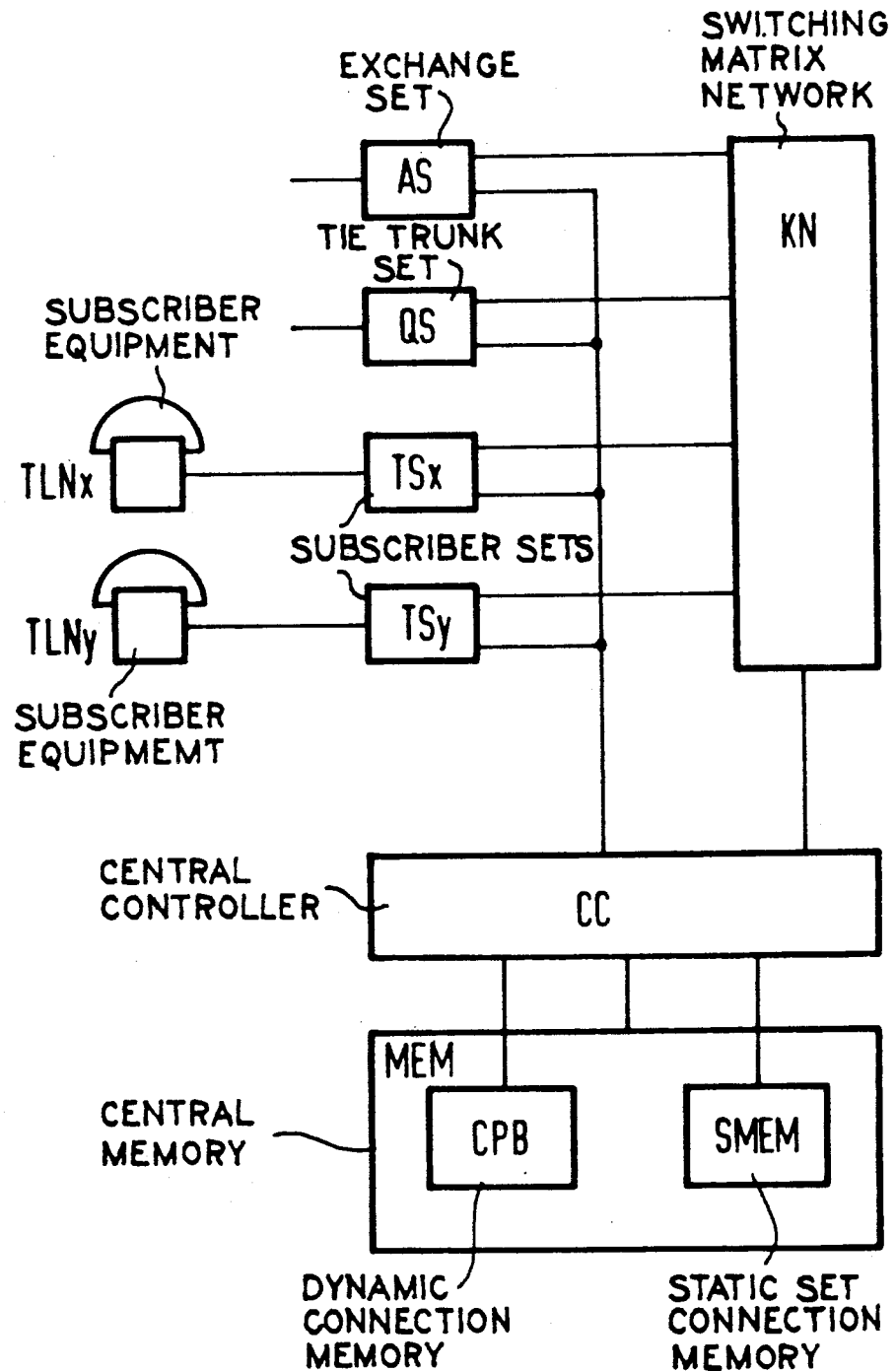

METHOD FOR TRANSMITTING SUBSCRIBER DATA IN COMMUNICATION SYSTEMS FROM ONE SECRET SUBSCRIBER EQUIPMENT TO ANOTHER

BACKGROUND OF THE INVENTION

1. Field of the Invention

The present invention relates to a method for transmission of subscriber data, particularly the name and the subscriber connection number of a calling party, between a subscriber terminal equipment of a communication system, particularly a private branch exchange communication system, comprising a central controller, a central memory and subscriber equipment connected to the communication system and having a display for displaying the subscriber data, whereby an inhibit information that prevents the display of subscriber data at the called subscriber equipment is transmitted to a receiving communication system from defined, calling, secret subscriber equipmens in common with the subscriber data belonging to these subscriber equipment.

2. Description of the Prior Art

Many subscriber equipment of communication systems have a display available for displaying exchange-oriented data. Among other things, it is therefore possible for the user of such equipment to learn about the subscriber terminal from which a call comes on the basis of the display of the subscriber data of the calling party, even before accepting a call. The display of the subscriber data at the called party occurs, for example, in internal and external calls, in manual switching position traffic, in automatic call back, in call transfer, when changing the destination of a call (call forwarding, call rerouting), in connection personal paging equipment, etc. On the basis of this display, the called party can decide whether or not to accept the call on the basis of personal interest of specifically entering into a connection with the calling party.

This fact was a precondition for the requirement for what are referred to as secret subscriber equipment that prevent a transmission of the connection-related subscriber data to the desired called party. The integrated services digital network process (ISDN) perform its feature of "secret call number" takes this requirement into consideration. A corresponding inhibit information is deposited for each secret subscriber equipment in a memory of a communication system that offers this performance feature. When setting up an external connection, the called subscriber equipment being located outside the communication system of the calling subscriber, this inhibit information is transmitted up to the receiving communication system together with the telephone number and the subscriber name and is stored there. In an internal call setup, the inhibit information is already available and, as in the case of the external connection, effects that what is referred to as a dummy information that does not result in a display at the called party and is forwarded to the called subscriber equipment instead of the subscriber data. A calling party who has a subscriber equipment with the performance feature of secret call number therefore receives a permanent data protection. Due to this data protection, a rejection of the call by the called party is no longer possible on the basis of the knowledge of the subscriber data of the calling party. However, it is likewise no longer possible that, on the basis of the knowledge of the party data of the calling subscriber, a call is accepted with priority by the called party. For example, an urgently-expected "secret caller" can no longer be distinguished from undesired calling parties, for whatever reasons. Problems with respect to the acceptance of secret subscriber equipment thereby arise.

SUMMARY OF THE INVENTION

Elimination of these acceptance problems is the object on which the present invention is based. It should be possible for the user of a secret subscriber equipment to make a new decision in each connection as to whether or not he is to reveal his personal subscriber data.

In combination with the method initially set forth, the above object is achieved, according to the present invention, by providing that, upon setup of a connection proceeding from a secret subscriber equipment, a program-oriented identification function is activated in the controller of the appertaining communication system on the basis of a cancel secrecy information, that an identification information is generated in response to the identification function, and the inhibit information deposited in a memory of the receiving communication system is suppressed by the identification information during the course of a call setup, the suppressing of the inhibit information being such that the subscriber data of the secret subscriber terminal are read from the memory of the receiving communication system and are displayed at the display of the subscriber equipment of the receiving communication system called by the secret subscriber equipment.

The functions of the secret subscriber equipment that were set forth above are preserved. In addition, the possibility is created of activating an identification function upon setup of a call, i.e. at an arbitrary time between picking up the receiver (call beginning) and clearing down the connection or generally on the basis of a cancel secrecy information. Dependent on the equipment of a communication system and of the subscriber equipment, this activation can occur by pressing a key specifically provided for that purpose, by selecting an identifier number that identifies the identification function or by inputting a corresponding voice instruction. General activation of the identification function in each call is achieved by entering the cancel secrecy information at a defined memory location of the central memory of the communication system that is allocated to the subscriber equipment. This entry is undertaken proceeding from a central location, for example from what is referred to as an operating terminal. The identification function initiates a program execution in the central controller of a communication system belonging to the secret subscriber equipment. This program execution is designed such that it effects the generation of an identification information. This identification information can cover a few bits or bytes and is allocated to the subscriber data and to the inhibit information, for example, in the dynamic connection memory of the communication system. This allocation occurs both in the communication system of the calling party and in the communication system of the called party, if these systems do not already correspond to one another on the basis of an internal connection. When the called subscriber equipment is located in an external communication system, then the transmission of the identification information to this communication system is also effected by the identification function. The control of the communication systems is designed such that in the case of a simultaneous presence of the identication information and of the inhibit information, with respect to one connection the transmission of the subscriber data to the display of the called subscriber equipment occurs given.

In this method of variable secrecy of the subscriber data, the communication parties who have a corresponding subscriber equipment available are lent the possibility of deciding themselves at any time whether and at what time they wish to reveal their identity. Their need for data protection can be met in a simple manner at any time. When it is not the desired person, with whom the calling party is familiar, who answers at the subscriber equipment of the called subscriber, then the calling party remains anonymous in spite of the presence of a display at the subscriber equipment of the called party. On the other hand, when the call is answered by the familiar person, the calling party can additionally identify himself to this person by enabling the transmission of the subscriber data to the subscriber equipment of the called party. The advantages of ISDN technology with respect to the transmission of subscriber data are therefore preserved and are even further enhanced by the method of variable secrecy of the subscriber data.

Specific developments and features of the invention shall be set forth below.

When a cancel secrecy information has been stored in the central memory with respect to a secret subscriber equipment, this cancel secrecy information entry can be suppressed proceeding from the subscriber equipment by selecting a corresponding identifier number, by pressing a special key or by voice command. The entry is erased or overwritten for the duration of the current connection. After cleardown of the current connection, the preceding condition is automatically restored on the basis of corresponding program executions. The possibility therefore results for the user of a subscriber equipment operated in this manner of keeping his subscriber data secret as needed. In all other cases, the subscriber data proceed to the display of the called subscriber equipment.

The activated identification function is deactivated by an operator action that corresponds to that at activation of the identification function. For example, the same key that was pressed for activating the identification function can be used by repeated pressing for deactivating the identification function. A special deactivation key, however, can fulfill the same purpose. The identification function is designed such that it generates a revoke information when it is deactivated. This revoke information is transmitted to all memories, to the external communication systems participating in the connection as well, in which the identification information is deposited. The revoke information reactivates the inhibit information by erasing or overwriting the identification information. The displayed subscriber data at the display of the called subscriber equipment is therefore extinguished. For example, an inadrertently released identification can thereby be cancelled.

The deactivation of the identification function occurs automatically when the communication connection is cleared down. It is thereby assured that a basic condition that guarantees the secret status of the subscriber equipment is set in a subsequent connection after a cancellation of the secret status of the secret subscriber equipment with respect to one connection.

In communication system in which a change of the call destination, for example, by call rerouting, call forwarding, is possible without initiation by the calling subscriber, the communication system controller that executes the change of call destination reactivates the inhibit information by overwriting or erasing the identification information. It is therefore assured that no unauthorized person receives the secret subscriber data.

Conversely, a secret subscriber equipment can be called due to the change of the call destination. The transmission of the subscriber data of the called party to the subscriber equipment of the calling party that is otherwise standard is prevented by allocating an inhibit information to the secret subscriber data. As in the transmission from the calling subscriber equipment to the called subscriber equipment, a display of the secret subscriber data in the opposite direction is prevented. When the called party, having a secret subscriber equipment wishes the display of his subscriber equipment data at the calling subscriber, then he achieves the same by activating the identification function proceeding from his subscriber equipment.

In modern communication systems, subscriber data are not used only for being displayed at the subscribers' equipment. The communication system often have a data module available in which the executed call requests are stored in a subscriber-associated fashion. It is not only the time, the duration and the incurred charges that are deposited in these modules; rather, information are also stored about to whom connection has been set up (subscriber data). The inhibit information transmitted in common with the subscriber data not only prevents the transmission of the subscriber data to the subscriber equipment, but also their transmission to the data module. When the inhibit information is deactivated, the subscriber data are transmitted not only to the party equipment of the called subscriber for display but are also forwarded to the data module for further processing.

When simultaneous connections of one subscriber equipment to a plurality of subscribers' equipment are possible in a communication system on the basis of what are referred to as multiple connections, then the user of a secret subscriber equipment activates the identification function separately for each individual call partner to whom he wishes to transmit his subscriber data. It is therefore guaranteed that only these subscribers' equipment defined by the user of a secret subscriber equipment receive his subscriber data, even in multiple connections.

In order to guarantee that the user of a secret subscriber equipment does not overlook this potentially-intended identification to the called party, a request for identification is signaled to him by the subscriber equipment. This can occur via a flashing identification key or on the basis of a corresponding instruction at the display. The activated identification function can likewise be signaled, for example, on the basis of a continuously-lit identification key or an appropriate symbol in a region of the display.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a schematic circuit representation of a communication system constructed and operating in accordance with the present invention.

DETAILED DESCRIPTION

On the drawing, there is schematically illustrated a communication system that is composed of a central controller CC, a central memory MEM that, among other things, comprises a static set connection memory SMEM and a dynamic connection memory CPB, a switching matrix network KN, a plurality of exchange sets AS and tie trunk sets QS for connection to other communication systems and a plurality of subscriber sets TSx ... TSy having respective subscriber equipment TLNx ... TLNy connected thereto.

By lifting up the receiver of his secret subscriber equipment TLNx, a calling party informs the communication system that he wishes a call set up. The central controller CC receives this request via a subscriber set TSx allocated to the secret subscriber equipment TLNx. In addition to the subscriber data, the inhibit information that states that the subscriber equipment TLNx belonging to this subscriber set TSx is a secret subscriber equipment is also deposited in the static set connection memory SMEM. The subscriber data and the inhibit information are transferred into the dynamic connection memory CPB. The user of the secret subscriber equipment then selects the telephone number of the internal subscriber equipment of the called party he wishes to enter into communication therewith. The controller CC checks in the memory MEM whether the subscriber equipment TLNy of the requested internal subscriber equipment is free. When this is the case, then the calling party receives a ringing tone via his secret subscriber equipment TLNyx and the called subscriber equipment TLNy outputs a call tone. Due to the inhibit information deposited in common with the subscriber data in the dynamic connection memory CPB, it is not the subscriber data that is transmitted to the subscriber equipment TLNy of the called party but the dummy information that produces no display at the display of the called subscriber equipment TLNy. Before or after selecting the destination telephone number, the user of a secret subscriber equipment has the possibility of activating an identification function in the central controller CC by pressing a special key at the subscriber equipment TLNx. This identification function effects the entry of a special identification information into the dynamic connection memory CPB that is allocated therein to the subscriber data and to the inhibit information. When a simultaneous presence of the inhibit information and the identification information with respect to this call is given the central controller CC initiates the transmission of the subscriber data from the dynamic connection memory CPB to the called subscriber equipment TLNy. The subscriber data are displayed on the display thereat. When the connection is cleared down, the data pertaining to this connection are erased in the dynamic connection memory CPB. The identification information is therefore also erased, as a result whereof the secret status of the secret subscriber equipment TLNx is restored.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of transmitting subscriber data including the name and subscriber connection number of a calling party between a secret status calling subscriber station and a called subscriber station which has a display for displaying the subscriber data, in a receiving communication system which comprises a central controller and a central memory, comprising the steps of:
   (a) storing the subscriber data and inhibit information assigned thereto in the central memory for the subscriber stations of those subscribers who are authorized a secret status;
   (b) upon setup of a connection between the secret status calling subscriber station and the called subscriber station, transmitting cancel secrecy information to the central controller to activate a program-oriented identification procedure;
   (c) in response to the activation of the program-oriented identification procedure, generating identification information;
   (d) in response to the identification information, suppressing the inhibit information and reading the stored subscriber data of the secret status calling subscriber station from the central memory; and
   (e) transmitting the read subscriber data to the called subscriber station for display.

2. The method of claim 1, wherein the step (b) of transmitting cancel secrecy information is further defined as:
   (b1) operating a special key at the secret status calling subscriber station.

3. The method of claim 1, wherein the step (b) of transmitting cancel secrecy information is further defined as:
   (b1) inputting an identification number at the secret status calling subscriber station.

4. The method of claim 1, wherein the step (b) of transmitting secrecy information is further defined as:
   (b1) automatically transmitting the cancel secrecy information to the central controller upon setup of the connection.

5. The method of claim 4, and further comprising the step of:
   (f) after the step (b1) of automatically transmitting cancel secrecy information, generating a deactivation information to deactivate the program-oriented identification procedure.

6. The method of claim 1, and further comprising the steps of:
   (f) deactivating the identification procedure; and
   (g) simultaneously reactivating the inhibit information.

7. The method of claim 6, wherein the step (g) of reactivating the inhibit function is further defined as:
   (g1) generating revoke information causing the central controller to reactivate the inhibit information.

8. The method of claim 1, and further comprising the step of:
   (f) deactivating the identification function with the central controller of the receiving communication system after cleardown of the connection.

9. The method of claim 1, in a receiving communication system in which a connection destination is possible without initiation by a calling subscriber, and further comprising the step of:

(f) in response to a change in the connection destination, reactivating the inhibiting information by the central controller of the receiving communication system.

10. The method of claim 9, in response to a secret status subscriber equipment being selected due to a change of the connection destination, and further comprising the steps of:
(g) generating inhibit information with the central controller assigned to the selected secret status subscriber equipment;
(h) transmitting the inhibit information to the receiving communication system of the calling subscriber along with the subscriber data; and
(i) preventing display of a subscriber data with the inhibit information at the calling subscriber station.

11. The method of claim 9, and further comprising the step of:
(j) deactivating the inhibit information of the calling subscriber by
activating the identification function at the selected secret subscriber station; and
generating the identification information.

12. The method of claim 1, in a communication system that has a data module for subscriber data holding and subscriber data processing and that does not receive the subscriber data given the presence of an inhibit information, and further comprising the steps of:
(f) activating the identification procedure and simultaneously deactivating the inhibit function; and
(g) transmitting the subscriber data to the data module after deactivation of the inhibit function by activation of the identification function.

13. The method of claim 1, in a communication system that allows multiple connections, and further defined as:
(f) deactivating the identification procedure for each call partner.

14. The method of claim 1, and further comprising the step of:
(f) transmitting a request for identification to the secret status calling subscriber station.

15. The method of claim 1, and further comprising the step of:
(f) displaying the activated identification function at the secret subscriber station.

* * * * *